(12) United States Patent
Okahara

(10) Patent No.: US 11,067,172 B2
(45) Date of Patent: Jul. 20, 2021

(54) CONTROL DEVICE AND CONTROL METHOD FOR CONTINUOUSLY VARIABLE TRANSMISSION

(71) Applicant: JATCO LTD, Fuij (JP)

(72) Inventor: Ken Okahara, Kanagawa (JP)

(73) Assignee: Jateo Ltd., Fuji (JP)

( * ) Notice: Subject to any disclaimer, the term of this patent is extended or adjusted under 35 U.S.C. 154(b) by 0 days.

(21) Appl. No.: 16/639,941

(22) PCT Filed: Sep. 11, 2018

(86) PCT No.: PCT/JP2018/033560
§ 371 (c)(1),
(2) Date: Feb. 18, 2020

(87) PCT Pub. No.: WO2019/054354
PCT Pub. Date: Mar. 21, 2019

(65) Prior Publication Data
US 2020/0248801 A1 Aug. 6, 2020

(30) Foreign Application Priority Data
Sep. 15, 2017 (JP) .............................. JP2017-178270

(51) Int. Cl.
*F16H 61/664* (2006.01)
*F16H 59/14* (2006.01)
(Continued)

(52) U.S. Cl.
CPC ........... *F16H 61/664* (2013.01); *F16H 59/14* (2013.01); *F16H 59/42* (2013.01); *F16H 59/70* (2013.01);
(Continued)

(58) Field of Classification Search
CPC ........ F16H 61/664; F16H 59/14; F16H 59/42; F16H 59/70; F16H 4059/174;
(Continued)

(56) References Cited

U.S. PATENT DOCUMENTS 5,857,937 A * 1/1999 Ashizawa ......... F16H 61/66254
477/46
5,993,338 A 11/1999 Kato et al.
(Continued)

FOREIGN PATENT DOCUMENTS

JP 11-194801 A 7/1999
JP 2002-106700 A 4/2002
(Continued)

*Primary Examiner* — Tinh Dang
(74) *Attorney, Agent, or Firm* — Global IP Counselors, LLP

(57) ABSTRACT

A control device for a continuously variable transmission performs transmission control so that an actual transmission control value becomes a target transmission control value. The control device includes a lead compensation unit, delay compensation unit, and a setting unit. The lead compensation unit performs lead compensation of the target transmission control value. The delay compensation unit performs delay compensation of the target transmission control value. The setting unit is configured to set as the target transmission control value a post-compensation target transmission control value for which compensation is performed by the lead compensation unit and the delay compensation unit according to at least one of an input side rotation speed of the continuously variable transmission, an input torque to a driven side rotation element of the continuously variable transmission, a transmission ratio of the continuously variable transmission, and a rate of change of the transmission ratio.

8 Claims, 6 Drawing Sheets

(51) Int. Cl.
*F16H 59/42* (2006.01)
*F16H 59/70* (2006.01)
*F16H 61/04* (2006.01)
*F16H 61/662* (2006.01)

(52) U.S. Cl.
CPC .. *F16H 2059/147* (2013.01); *F16H 2059/702* (2013.01)

(58) Field of Classification Search
CPC ........... F16H 2049/702; F16H 61/0437; F16H 61/662; B60W 10/04; B60W 10/06; B60W 10/10; B60W 10/11
See application file for complete search history.

(56) References Cited

U.S. PATENT DOCUMENTS

| | | | |
|---|---|---|---|
| 7,558,660 B2 * | 7/2009 | Izumi | F16H 61/66272 477/38 |
| 10,295,001 B2 * | 5/2019 | Ando | F16H 61/143 |
| 10,731,757 B2 * | 8/2020 | Kawasumi | F16H 61/702 |
| 2019/0078685 A1 | 3/2019 | Kawasumi et al. | |

FOREIGN PATENT DOCUMENTS

| | | |
|---|---|---|
| JP | 2011-207240 A | 10/2011 |
| JP | 2017-160982 A | 9/2017 |
| JP | 2018-001131 A | 1/2018 |

* cited by examiner

CONTROL DEVICE AND CONTROL METHOD FOR CONTINUOUSLY VARIABLE TRANSMISSION

CROSS-REFERENCE TO RELATED APPLICATIONS

This is a U.S. national phase application of PCT/JP2018/033560, filed on Sep. 11, 2018, which claims priority to Japanese Patent Application No. 2017-178270, filed on Sep. 15, 2017. The entire disclosure of Japanese Patent Application No. 2017-178270 is hereby incorporated herein by reference.

TECHNICAL FIELD

The present invention relates to a control device and a control method for a continuously variable transmission mounted in a vehicle.

BACKGROUND ART

In Japanese Unexamined Patent Publication No. 2002-106700, disclosed is a technique relating to transmission control of a continuously variable transmission, that does lead compensation of a target transmission ratio by the amount of response delay of the actual transmission ratio with respect to the target transmission ratio.

With the continuously variable transmission, there are cases when vibration is caused in the longitudinal direction by the resonance frequency of the powertrain. When there is insufficient stability of the transmission ratio of the continuously variable transmission with respect to torque fluctuation of the powertrain, longitudinal vibration conceivably occurs linked with the torque fluctuation and gear shifting of the continuously variable transmission. For this reason, lead compensation is performed, and it is conceivable that by increasing the stability of the transmission ratio of the continuously variable transmission, in other words, damping, it is possible to suppress longitudinal vibration. As lead compensation, it is conceivable to fix the lead amount for the peak value frequency and perform lead compensation. The peak value frequency is the frequency at which the lead amount according to frequency shows a peak. However, depending on the operating state of the vehicle, there is the risk that the lead amount may be insufficient, and that sufficient damping performance cannot be obtained. On the other hand, with lead compensation, when the lead amount is made larger, high frequency gain becomes larger, so if the lead amount is too large, there was the problem that the transmission ratio control system becomes unstable.

The purpose of the present invention is to provide a control device of a continuously variable transmission for which it is possible to obtain a damping effect while ensuring stability of the transmission ratio of the continuously variable transmission that performs lead compensation.

SUMMARY

The present invention is a control device for a continuously variable transmission that performs transmission control of a continuously variable transmission so that an actual transmission control value becomes a target transmission control value, having a lead compensation unit that performs lead compensation of the target transmission control value, a delay compensation unit that performs delay compensation of the target transmission control value, and a setting unit that sets as the target transmission control value a post-compensation target transmission control value for which compensation was performed by the lead compensation unit and/or the delay compensation unit according to at least one of an input side rotation speed of the continuously variable transmission, an input torque to the driven side rotation element of the continuously variable transmission, a transmission ratio of the continuously variable transmission, and a rate of change of the transmission ratio.

Thus, it is possible to set as the target transmission control value the post-compensation target transmission control value in the region in which longitudinal vibration occurs. For this reason, it is possible to improve the stability of the transmission ratio of the continuously variable transmission as necessary by lead compensation and delay compensation of the target transmission control value, and by converging the longitudinal vibration, it is possible to appropriately improve the longitudinal vibration of the continuously variable transmission. It is also possible to increase the stability of the transmission ratio by phase lead compensation and/or phase delay compensation, and possible to improve the control responsiveness of the transmission ratio.

DETAILED DESCRIPTION OF EMBODIMENTS

Figure 1:
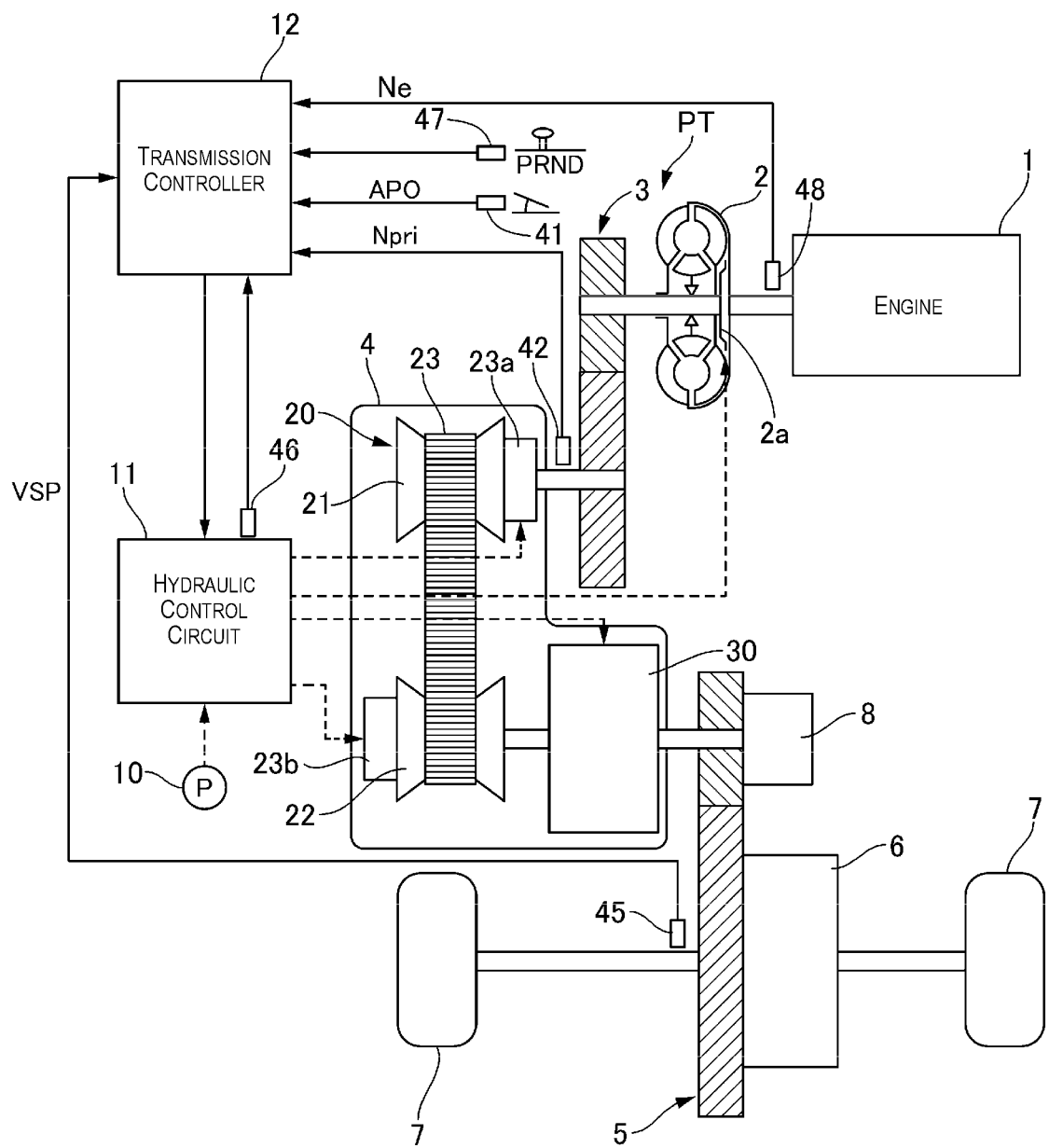
FIG. 1 is a schematic block diagram of a vehicle including a transmission controller of an embodiment.

FIG. 1 is a schematic block diagram of a vehicle including a transmission controller of an embodiment. The vehicle comprises an engine 1 as a power source. The power of the engine 1 is transmitted to a drive wheel 7 via a torque converter 2, a first gear train 3, a transmission 4, a second gear train (final gear) 5, and a differential device 6 configuring a powertrain PT. A parking mechanism 8 that mechanically locks the output shaft of the transmission 4 to be non-rotatable when parking is provided on the second gear train 5.

The torque converter 2 has a lock-up clutch 2a. When the lock-up clutch 2a is engaged, there is no slipping of the torque converter 2, and the transmission efficiency of the torque converter 2 improves. Hereafter, the lock-up clutch 2a is noted as LU clutch 2a.

The transmission 4 is a continuously variable transmission having a variator 20. The variator 20 has a pulley 21 that is the primary pulley, a pulley 22 that is the secondary pulley, and a belt 23 that is stretched around between the pulleys 21, 22. The pulley 21 configures a driving side rotation element, and the pulley 22 configures a driven side rotation element.

The pulleys 21, 22 respectively have: a fixed conical plate, a movable conical plate that is placed opposing a sheave surface with respect to the fixed conical plate and that forms a V-groove with the fixed conical plate, and a hydraulic cylinder that is provided on the back surface of the movable conical plate and that displaces the movable conical plate in the axial direction. The pulley 21 has a hydraulic cylinder 23a, and the pulley 22 has a hydraulic cylinder 23b.

When the hydraulic pressure supplied to the hydraulic cylinders 23a, 23b is adjusted, the V-groove width changes, the contact radius between the belt 23 and each pulley 21, 22 changes, and the transmission ratio of the variator 20 changes continuously. The variator 20 may also be a toroidal type continuously variable transmission.

The transmission 4 further comprises a sub transmission mechanism 30. The sub transmission mechanism 30 is a transmission mechanism of two forward gears and one reverse gear, and as the forward transmission gears, there is $1^{st}$ gear, and $2^{nd}$ gear that has a smaller transmission ratio than $1^{st}$ gear. The sub transmission mechanism 30 has the variator 20 provided in series in the power transmission path from the engine 1 to the drive wheel 7. The sub transmission mechanism 30 may be directly connected to the output shaft of the variator 20 as shown in this example, and may also be connected via a power transmission mechanism such another gear shift or a gear train, etc. Alternatively, the sub transmission mechanism 30 may also be connected to the input shaft side of the variator 20.

The vehicle has: an oil pump 10 that is driven using a portion of the power of the engine 1, a hydraulic control circuit 11 that adjusts the hydraulic pressure generated by the oil pump 10 and supplies that to each part of the transmission 4, and a transmission controller 12 that controls the hydraulic control circuit 11. The hydraulic control circuit 11 is configured from a plurality of flow paths and a plurality of hydraulic control valves. The hydraulic control circuit 11 controls the plurality of hydraulic control valves to switch the hydraulic supply path based on transmission control signals from the transmission controller 12. Also, the hydraulic control circuit 11 adjusts the necessary hydraulic pressure from the hydraulic pressure generated by the oil pump 10, and supplies the adjusted hydraulic pressure to each part of the transmission 4. By doing this, shifting of the variator 20, changing of the gears of the sub transmission mechanism 30, and engagement and release of the LU clutch 2a are performed.

Figure 2:
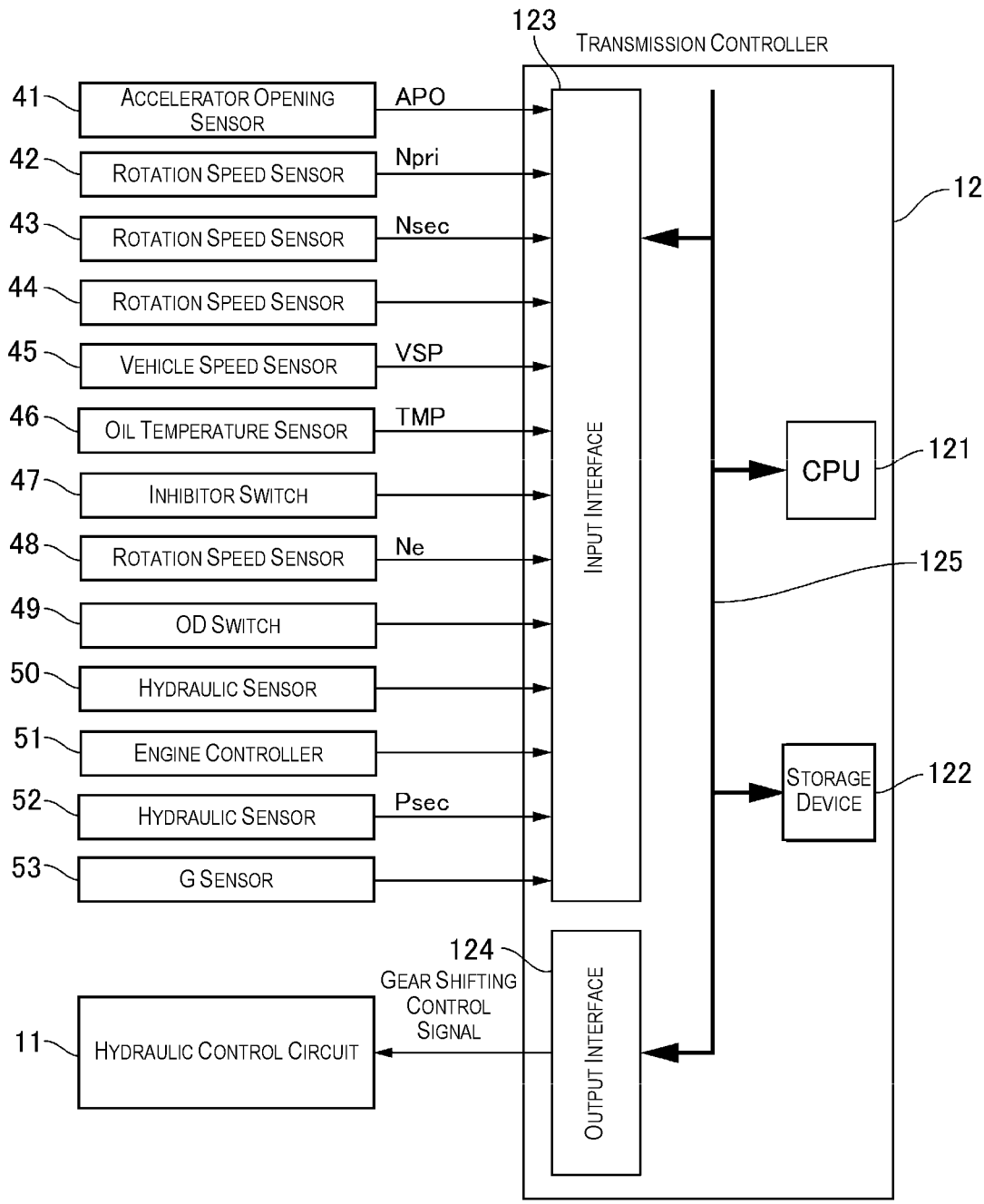
FIG. 2 is a schematic block diagram of the transmission controller of the embodiment.

FIG. 2 is a schematic block diagram of the transmission controller 12 of the embodiment. The transmission controller 12 has: a CPU 121, a storage device 122 comprising RAM•ROM, an input interface 123, an output interface 124, and a bus 125 that connects these to each other.

The input interface 123 has input, for example, the output signal of an accelerator opening sensor 41 that detects an accelerator opening APO expressing the operating amount of an accelerator pedal, an output signal of a rotation speed sensor 42 that detects the input side rotation speed of the transmission 4, an output signal of a rotation speed sensor 43 that detects a rotation speed Nsec of the pulley 22, and an output signal of a rotation speed sensor 44 that detects the output side rotation speed of the transmission 4.

The input side rotation speed of the transmission 4, in specific terms, is the rotation speed of the input shaft of the transmission 4, in other words, rotation speed Npri of the pulley 21. The output side rotation speed of the transmission 4, in specific terms, is the rotation speed of the output shaft of the transmission 4, in other words, the rotation speed of the output shaft of the sub transmission mechanism 30. The input side rotation speed of the transmission 4, for example, may also be the rotation speed of a position sandwiching the gear train, etc. with the transmission 4, such as the turbine rotation speed of the torque converter 2, etc. The same is also true for the output side rotation speed of the transmission 4.

The input interface 123 has input, for example, an output signal of a vehicle speed sensor 45 that detects a vehicle speed VSP, an output signal of an oil temperature sensor 46 that detects an oil temperature TMP of the transmission 4, an output signal of an inhibitor switch 47 that detects the position of a select lever, an output signal of a rotation speed sensor 48 that detects a rotation speed Ne of the engine 1, an output signal of an OD switch 49 for expanding the transmission range of the transmission 4 to a transmission ratio smaller than 1, an output signal of a hydraulic sensor 50 that detects the hydraulic pressure supplied to the LU clutch 2a, an output signal of a hydraulic sensor 52 that detects a secondary pressure Psec that is the hydraulic pressure supplied to the pulley 22, an output signal of a G sensor 53 that detects the longitudinal acceleration of the vehicle, etc. Also input to the input interface 123 are torque signals of engine torque Te from an engine controller 51 that controls the engine 1.

Stored in the storage device 122 are a transmission control program of the transmission 4, and various types of maps, etc. used for the transmission control program. The CPU 121 reads and executes the transmission control program stored in the storage device 122, and generates transmission control signals based on various types of signals input via the input interface 123. Also, the CPU 121 outputs the generated transmission control signals to the hydraulic control circuit 11 via the output interface 124. Various types of values used with the calculation processing by the CPU 121 and the calculation results of the CPU 121 are stored as appropriate in the storage device 122.

The transmission 4 may generate longitudinal vibration at a PT resonance frequency Fpt that is the resonance frequency of the powertrain PT. The longitudinal vibration is thought to occur with coupling of torque fluctuation and shifting of the transmission 4 when there is insufficient stability of the transmission ratio of the transmission 4 with respect to torque fluctuation of the powertrain PT. For this reason, lead compensation is performed, stability of the transmission ratio of the transmission 4 is ensured, and by increasing damping, the longitudinal vibration is suppressed.

Figure 3:
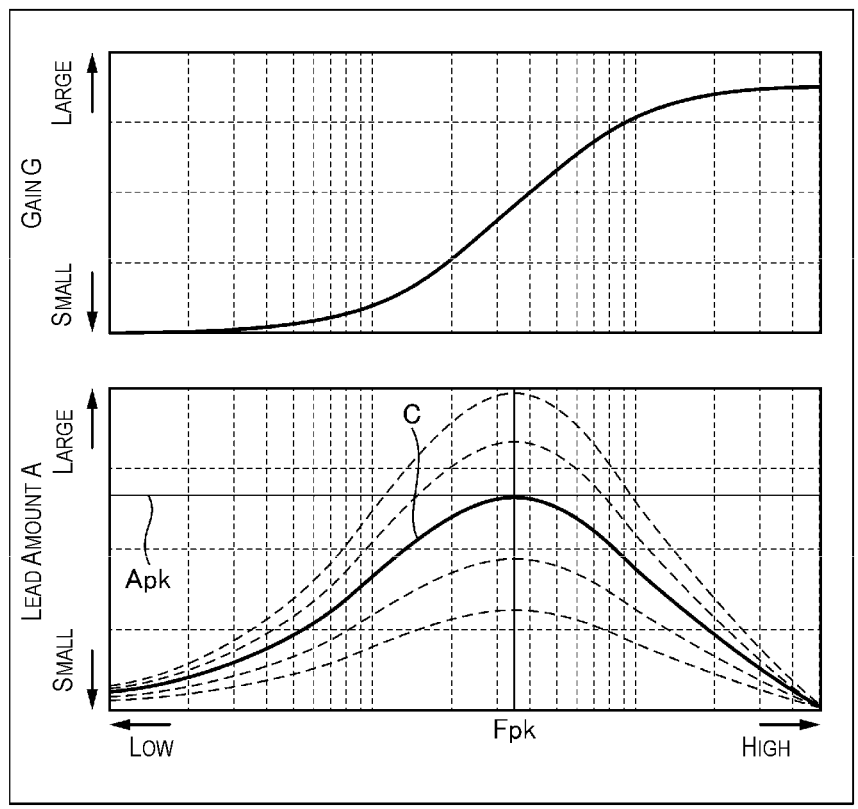
FIG. 3 is a drawing showing an example of a Bode diagram of a phase lead compensator.

However, depending on the traveling state of the vehicle, as is explained next, there are cases when a sufficient damping effect using lead compensation cannot be obtained. FIG. 3 is a drawing showing an example of a Bode diagram of a phase lead compensator. The horizontal axis of the Bode diagram shows a logarithmic display of frequency. FIG. 3 shows a case of performing secondary phase lead compensation. Peak value frequency Fpk is the frequency at which a lead amount A according to frequency shows a peak, and is set according to the targeted frequency by phase lead compensation. The targeted frequency, in specific terms, is the PT resonance frequency Fpt. For this reason, the peak value frequency Fpk is set to the PT resonance frequency Fpt, for example. Lead amount Apk shows the lead amount A according to the peak value frequency Fpk.

A curve C shows an example of the lead amount A according to frequency. The lead amount A according to frequency is the lead amount A of the phase lead compensation, and is the lead amount A according to the vibration frequency of torsional vibration of the input shaft of the transmission 4. The lead amount A according to frequency may be understood to be the lead amount A corresponding to a certain frequency such as the PT resonance frequency Fpt, for example, of the curve C. With FIG. 3, as the gain G, the gain corresponding to the curve C is shown.

Here, for suppression of longitudinal vibration, as phase lead compensation, it is conceivable to fix the lead amount Apk in the peak value frequency Fpk and perform phase lead compensation. Said another way, it is conceivable to fix the lead amount A according to frequency to the curve C, for example, and perform phase lead compensation. However, depending on the operating state of the vehicle, there were times when the lead amount A was insufficient, and a sufficient damping effect could not be obtained. On the other hand, the damping effect tends to become greater the more the lead amount Apk of the peak value frequency Fpk increases. For this reason, it is conceivable to make the lead amount Apk according to frequency be variable according to the operating state of the vehicle. However, when the lead amount Apk is increased, the gain G also increases, so if the lead amount Apk is made too large, there is concern that a transmission ratio control system 100 described later will become unstable. Also, the stability of the transmission ratio control system 100 differs according to the operating state of the vehicle.

On the other hand, when the lead amount Apk is made larger, when the state of the transmission controller 12 changes, there are cases when the lead amount Apk becomes unsuitable. In light of that, in addition to phase lead compensation, it is desirable to perform phase delay compensation. However, depending on the operating state of the vehicle, there is concern that there will be an insufficient delay amount B, and that vehicle vibration will occur due to PT resonance. Also, when there is too much delay amount B, there is the risk that the control system will become unstable, and low frequency control excitation will occur.

In light of that, the transmission controller 12 (hereafter also noted as controller 12) performs the transmission control explained hereafter. Hereafter, use of a transmission ratio Ratio of the variator 20 as the transmission ratio of the transmission 4 is explained. The transmission ratio Ratio is a collective name for the transmission ratios of the variator 20 including actual transmission ratio Ratio_A, target transmission ratio Ratio_D, and reached transmission ratio Ratio_T described hereafter.

Figure 4:
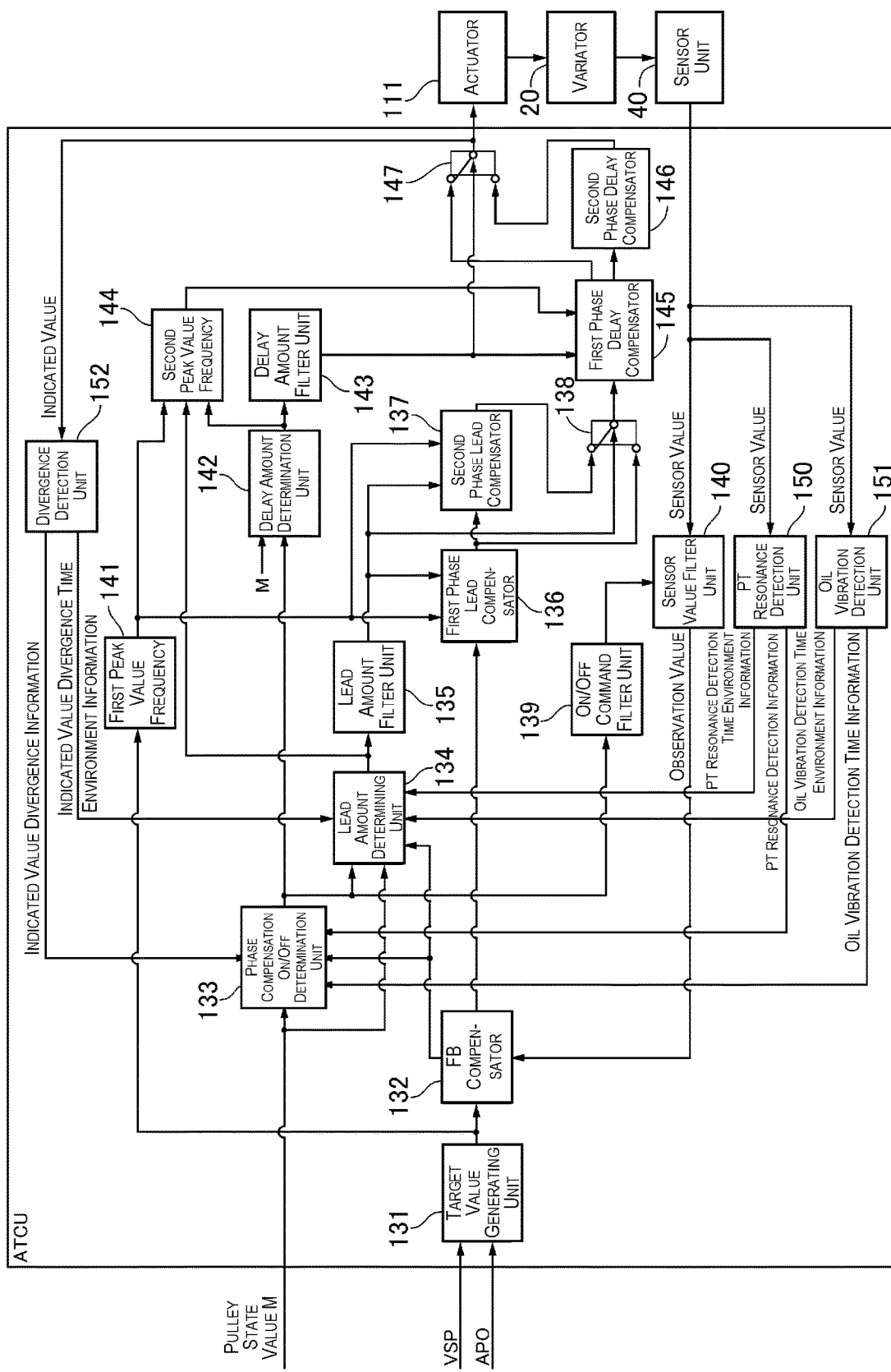
FIG. 4 is a drawing showing an example of a block diagram showing the main parts of a transmission ratio control system.

FIG. 4 is a control block diagram showing the main parts of the transmission ratio control system of the embodiment. The transmission ratio control system 100 performs feedback transmission control of the transmission 4 by performing transmission ratio control of the transmission 4 so that the actual transmission control value becomes the target transmission control value. The transmission ratio control system 100 is configured from the controller 12, an actuator 111, and the variator 20.

The controller 12 has: a target value generating unit 131; an FB compensator 132; a phase compensation on/off determination unit 133; a lead amount determining unit 134; a lead amount filter unit 135; a first phase lead compensator 136; a second phase lead compensator 137; a first switching unit 138; an on/off command filter unit 139; a sensor value filter unit 140; a first peak value frequency determination unit 141; a delay amount determination unit 142; a delay amount filter unit 143; a second peak value frequency determination unit 144; a first phase delay compensator 145; a second phase delay compensator 146; a second switching unit 147; a PT resonance detection unit 150; an oil vibration detection unit 151; and a divergence detection unit 152. FB is an abbreviation for feedback.

The target value generating unit 131 generates a target value for the transmission control. In specific terms, the target value is the target transmission ratio Ratio_D based on the reached transmission ratio Ratio_T which is the final target transmission control value with the transmission ratio Ratio as the transmission control value. The transmission control value may also be a primary pressure Ppri as a control parameter, for example. The reached transmission Ratio_T is preset according to the operating state of the vehicle with a shift map. For this reason, the target value generating unit 131 reads the corresponding reached transmission ratio Ratio_T from the shift map based on the detected operating state. In specific terms, the operating state of the vehicle uses vehicle speed VSP and accelerator opening APO.

The target value generating unit 131 calculates the target transmission ratio Ratio_D based on the reached transmission ratio Ratio_T. The target transmission ratio Ratio_D is a transient target transmission ratio in the time until becoming the reached transmission ratio Ratio_T, and configures the target transmission control value. The calculated target transmission ratio Ratio_D is input to the FB compensator 132.

The FB compensator 132 calculates the feedback command value based on the actual transmission ratio Ratio_A which is the actual value of the transmission ratio Ratio, and the target transmission ratio Ratio_D. The feedback command value is, for example, a feedback primary indicated pressure Ppri_FB for eliminating an error of the actual transmission ratio Ratio_A and the target transmission Ratio_D. With the FB compensator 132, FB gain G_FB is variable. The FB gain G_FB is the FB gain of the transmission ratio control of the transmission 4 performed by the transmission ratio control system 100, and is variable according to the operating state of the vehicle. The operating state of the vehicle is the transmission ratio Ratio, a rate of change α of the transmission ratio Ratio, an input torque Tpri, etc., for example. The rate of change α of the transmission ratio Ratio, said another way, is the gear shifting speed. The feedback command value calculated by the FB compensator 132 (feedback primary indicated pressure Ppri_FB) is input to the lead amount determining unit 134, and the first phase lead compensator 136.

The phase compensation on/off determination unit 133 determines on/off of the phase lead compensation and the phase delay compensation of the feedback primary indicated pressure Ppri_FB. The phase compensation on/off determination unit 133 determines on/off of the phase compensation according to a pulley state value M, the indicated value divergence information of a divergence detection unit 152 described later, the FB gain G_FB, the oil vibration detection information of the oil vibration detection unit 151 described later, the PT resonance information of the PT resonance detection unit 150 described later, and the target transmission ratio Ratio_D. The pulley state value M is a value for determining whether pulleys 21, 22 are in a state for which longitudinal vibration occurs, and includes rotation speed Npri, input torque Tsec to the pulley 22, transmission ratio Ratio, and rate of change α of the transmission ratio Ratio. The input torque Tsec can be calculated as a value for which the transmission ratio (gear ratio of the first gear train 3 and transmission ratio of the variator 20) set between the engine 1 and the pulley 22, for example, is multiplied by the engine torque Te. For the transmission ratio Ratio, it is possible to apply the actual transmission ratio Ratio_A and the target transmission ratio Ratio_D. The transmission ratio Ratio may also be the actual transmission ratio Ratio_A or the target transmission ratio Ratio_D.

In specific terms, the phase compensation on/off determination unit 133 determines on/off of the phase lead compensation and phase delay compensation of the feedback primary indicated pressure Ppri_FB according to all four parameters of the rotation speed Npri, the input torque Tsec, the transmission ratio Ratio, and the rate of change α. The phase compensation on/off determination unit 133 may also be configured to determine on/off of the phase lead compensation and phase delay compensation according to any one of the parameters of the input torque Tsec, the transmission ratio Ratio, and the rate of change α. The phase compensation on/off determination unit 133, in addition to the pulley state value M, determines on/off of the phase compensation of the feedback primary indicated pressure Ppri_FB also according to the engagement state of the LU clutch 2a, the state of driver operation with respect to the transmission ratio 4, and the presence or absence of failure.

Figure 5:
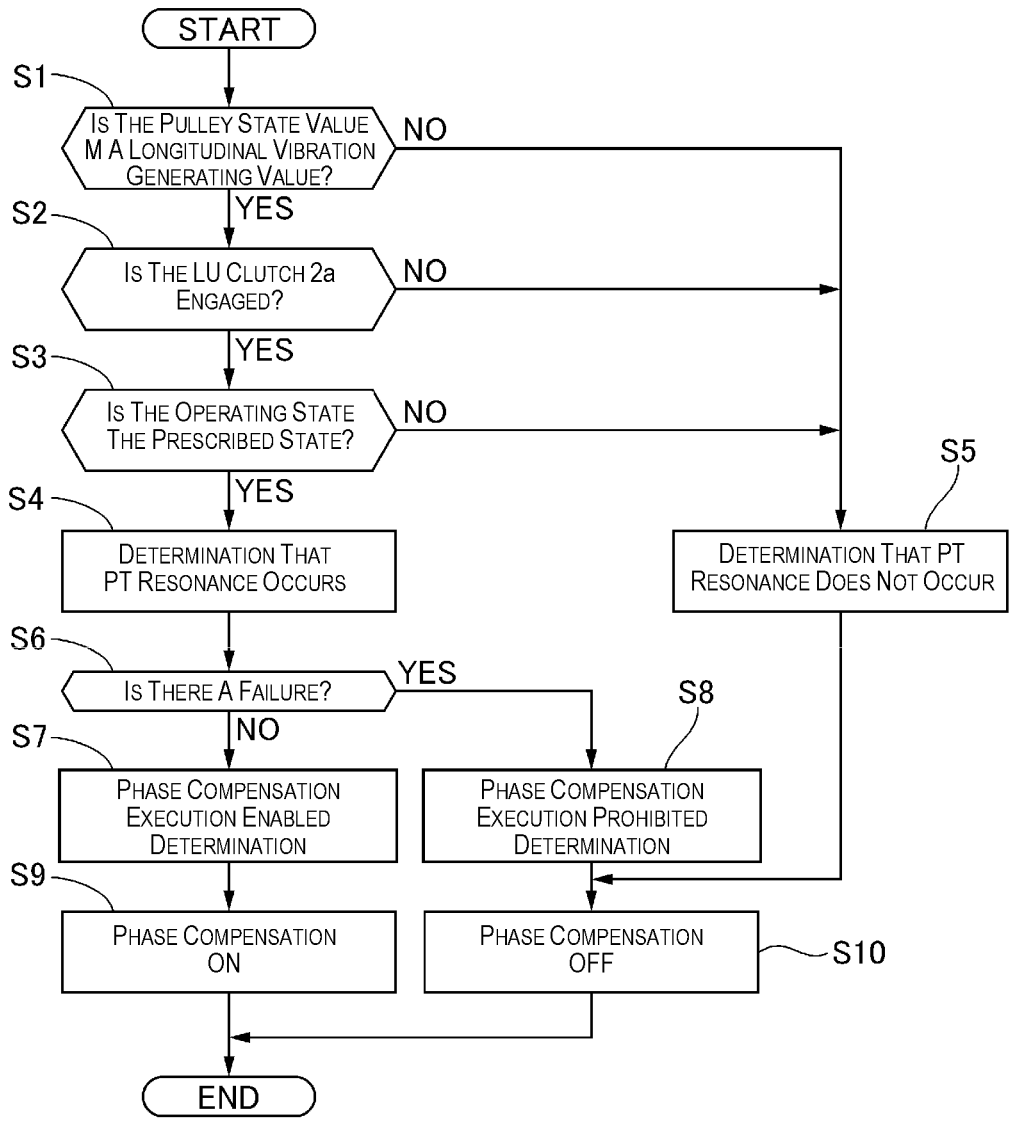
FIG. 5 is a flow chart showing an example of control performed by the transmission controller.

FIG. 5 is a flow chart representing the processing performed by the phase compensation on/off determination unit of the embodiment. The processing from step S1 to step S5 is processing for judging whether resonance of the powertrain PT occurs, said another way, processing for judging whether longitudinal vibration of the transmission 4 occurs. Hereafter, the resonance of the powertrain PT is noted as PT resonance.

Figure 6:
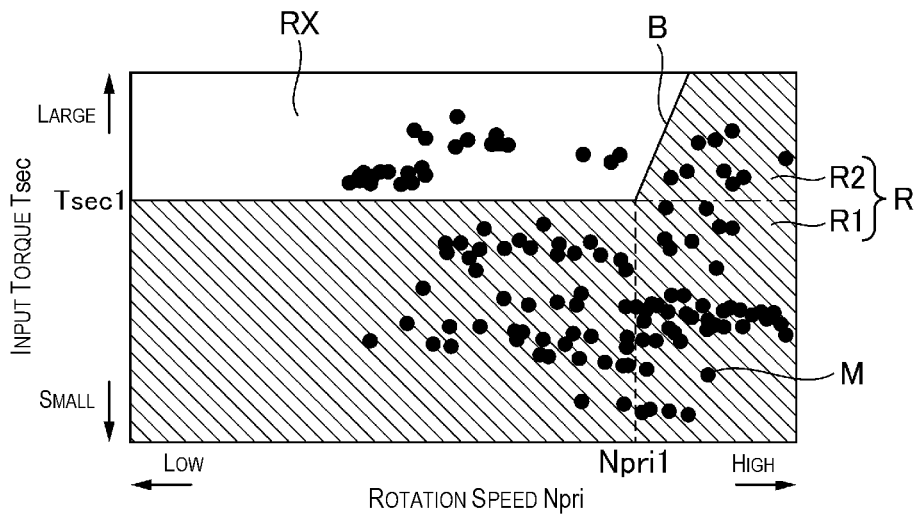
FIG. 6 is an explanatory drawing of a phase compensation region.

At step S1, a judgment is made of whether the pulley state value M is a value for which longitudinal vibration occurs. At step S1, the following judgment is performed regarding each of the rotation speed Npri, the input torque Tsec, the transmission ratio Ratio, and the rate of change α of the transmission ratio Ratio which are pulley state values M. FIG. 6 is an explanatory drawing of a phase compensation region. FIG. 6 shows the operating point M distribution with a plurality of operating points M. A phase compensation region R is set according to the rotation speed Npri and the input torque Tsec to the pulley 22. The phase compensation region R further includes a region R2 for which the input torque Tsec is a prescribed torque Tsec1 or greater, and the rotation speed Npri is a prescribed rotation speed Npri1 or greater. The prescribed rotation speed Npri1 is set to be larger the larger that the input torque Tsec is. The prescribed rotation speed Npri1 is set to regulate a boundary B. The boundary B is a straight line for which the rotation speed Npri increases proportionally to the input torque Tsec.

The prescribed torque Tsec1 and the prescribed rotation speed Npri1 are values for regulating the input torque Tsec and the rotation speed Npri by which longitudinal vibration occurs, and can be preset by experimentation, etc. The phase compensation region R includes the operating points M when the accelerator pedal is pressed down at an opening degree that matches the road load during coast travel. The operating points M are not distributed in regions lower than the rotation speed Npri corresponding to the idling rotation speed of the engine 1.

The region partitioned from the phase compensation region R by the boundary B is a rebound region RX. Here, the indicated pressure before implementation of phase compensation on the feedback primary indicated pressure Ppri_FB is defined as Ppri_D1, and the indicated pressure after phase compensation as Ppri_D2. With the rebound region RX, when the indicated pressure Ppri_D2 is set, as a result of the indicated pressure vibrating, it is possible that vibration of the actual pressure Ppri_A may be caused. For this reason, when the operating points M are not in the phase compensation region R, by setting the indicated pressure Ppri_D1, not only is unnecessary increase of stability of the transmission ratio Ratio prevented, but occurrence of vibration of the actual pressure Ppri_A is prevented.

However, the phase compensation region R is set when the transmission ratio Ratio is greater than a prescribed transmission ratio Ratio1, said another way, when the transmission ratio Ratio is more to the low side than the prescribed transmission ratio Ratio1. The prescribed transmission ratio Ratio1 is a value for regulating the transmission ratio at which longitudinal vibration occurs, and is 1, for example. The prescribed transmission ratio Ratio1 can be preset by experimentation, etc.

The phase compensation region R is also set when the rate of change α of the transmission ratio Ratio is smaller than a prescribed value α1. The prescribed value α1 is a value for regulating the rate of change of the transmission ratio Ratio at which longitudinal vibration occurs, and in specific terms, is specifically set as a judgment value for whether the transmission ratio Ratio is in a steady state. The prescribed value α1 can be preset by experimentation, etc. The phase compensation region R is also set when the LU clutch 2a is engaged. With the embodiment, the phase compensation region R itself is also set in a form set according to the transmission ratio Ratio, the rate of change α, and the engagement state of the LU clutch 2a. The same is also true for the operating points M.

Figure 7:
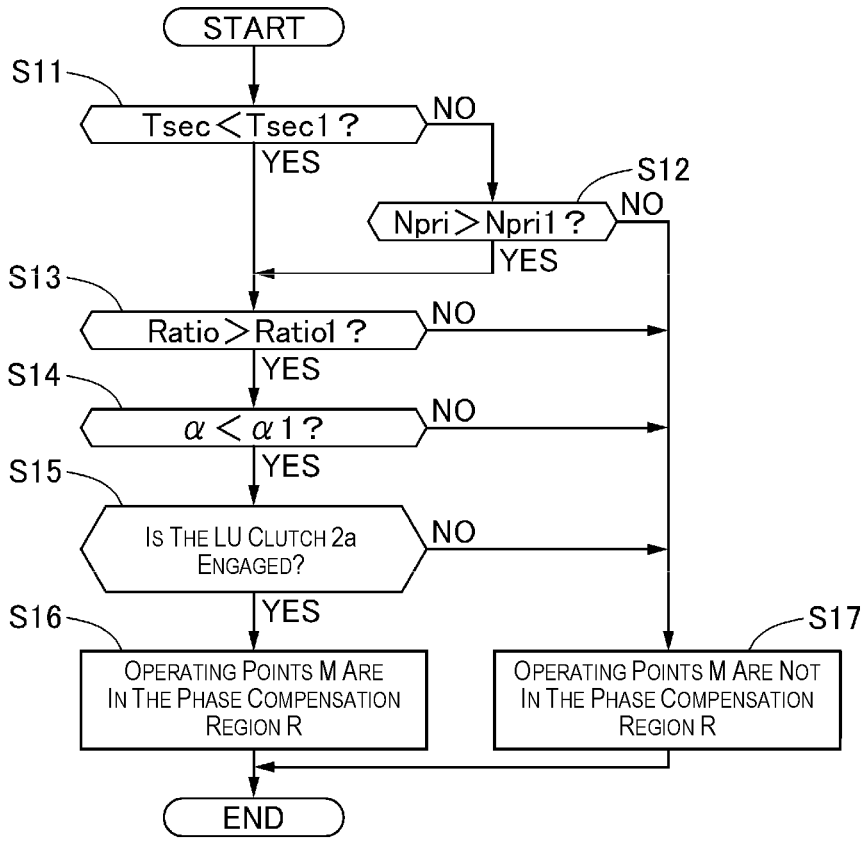
FIG. 7 is a flow chart showing an example of control performed by the transmission controller.

FIG. 7 is a flow chart for judging whether the operating points M are within the phase compensation region.

At step S11, a judgment is made of whether the input torque Tsec is smaller than the prescribed torque Tsec1, and when Tsec is Tsec1 or greater, the process advances to step S22, and when Tsec is smaller than Tsec1, the process advances to step S13.

At step S12, a judgment is made of whether the rotation speed Npri is greater than the prescribed rotation speed Npri1, and when greater, the process advances to step S13, and when Npri is Npri1 or less, the process advances to step S17.

At step S13, a judgment is made of whether the transmission ratio Ratio is greater than the prescribed transmission ratio Ratio1. In specific terms, a judgment is made of whether the actual transmission ratio Ratio_A or the target transmission ratio Ratio_D is greater than the prescribed transmission ratio Ratio1. Whether the Ratio is greater than Ratio1 can be judged by whether the OD switch 49 is OFF, for example. The actual transmission ratio Ratio_A and the target transmission ratio Ratio_D may also be calculated values. When determined to be greater at step S13, the process advances to step S14, and when other than that, the process advances to step S17.

At step S14, a judgment is made of whether the rate of change α is smaller than a prescribed value α1. Whether the rate of change α is smaller than the prescribed value α1 can be judged by whether the transmission ratio Ratio is in a fixed state by a driver operation such as whether the manual range is selected with the select lever, etc., based on the output of an inhibitor switch 47, for example. When it is judged at step S14 that the rate of change α is smaller than the prescribed value α1, the process advances to step S15, and when other than that, the process advances to step S17.

At step S15, a judgment is made of whether the LU clutch 2a is engaged. Whether the LU clutch 2a is engaged can be judged based on the output of the hydraulic sensor 50. When the LU clutch 2a is engaged, the process advances to step S16, and when other than that, the process advances to step S17.

At step S16, a judgment is made of whether the operating points M are in the phase compensation region R.

At step S17, a judgment is made that the operating points M are not in the phase compensation region R. Said another way, the operating points M are judged to be in the rebound region RX.

At step S1 of FIG. 5, when it is judged that all of these pulley state values M are longitudinal vibration generating values, the process advances to step 52. On the other hand, when any of these pulley state values M is judged to be not a longitudinal vibration generating value, the process advances to step S5, and it is judged to not be PT resonance. Therefore, when judged to not generate longitudinal vibration, the process advances to step S10, and the phase compensation is turned off.

At step S2, a judgment is made of whether the LU clutch 2a is engaged. By doing this, on/off of the phase compensation is determined according to the engagement state of the LU clutch 2a. When the LU clutch 2a is released, when it is judged that longitudinal vibration is not generated, and the process advances to step S5, and when the LU clutch 2a is engaged, it is judged that there is a state with longitudinal vibration being generated, and the process advances to step S3.

At step S3, a judgment is made of whether the state of the driver operation on the transmission 4 is a prescribed state, and a judgment is made of whether it is a first operating state in which the transmission ratio Ratio is greater than the prescribed transmission ratio Ratio1, or a second operating state in which the transmission ratio Ratio is in a steady state.

The first operating state is a state with the OD switch 49 OFF. The second operating state is a state for which the transmission ratio Ratio is fixed by a driver operation, such as a state for which the manual range is selected using the select lever, or a state when a manual mode such as sports mode, etc., is selected. By judging whether the state of the driver operation is a prescribed state, it is possible to judge that the transmission ratio Ratio is continuously larger than the prescribed transmission ratio Ratio1, or that the transmission ratio Ratio1 is continuously in a steady state. Thus, it is reliably judged that the transmission ratio Ratio is in a state for which longitudinal vibration is generated. At step S3, when judged to not be the prescribed state, the process advances to step S5, and when judged to be in the prescribed state, the process advances to step S4.

At step S4, when judged that PT resonance occurs, the process advances to step S6. At from step S6 to step S8, a judgment is performed of whether in a state for which it is possible to turn the phase compensation on. Said another way, a judgment is made of whether phase compensation can be executed.

At step S6, a judgment is made of whether there is a failure. Failure is a failure relating to the transmission 4 including failure of the hydraulic control circuit 11 or sensors or switches used for transmission control of the transmission 4, for example. This can also be another vehicle failure related to the transmission 4.

At step S6, when judged that there is a failure, the process advances to step S8, and execution of phase compensation is prohibited, the process advances to step S10 and phase compensation is turned off. On the other hand, when judged that there is no failure, the process advances to step S7, execution of phase compensation is enabled, and the process advances to step S9 and the phase compensation is turned on.

Returning to FIG. 4, the phase compensation on/off determination unit 133 outputs an on command when phase compensation on is determined, and outputs an off command when phase compensation off is determined. The on/off command is input from the phase compensation on/off determination unit 133 to the lead amount determining unit 134 and the on/off command filter unit 139.

The lead amount determining unit 134 determines the lead amount Apk. The lead amount determining unit 134 is provided in the wake of the phase compensation on/off determination unit 133. The lead amount determining unit 134 is provided in this way in light of placement in the signal path. The lead amount determining unit 134 determines the lead amount Apk according to the on/off command, said another way, according to the on/off determination of the phase compensation. The lead amount determining unit 134 determines the lead amount Apk to be zero when the off command is input. The lead amount determining unit 134 determines the lead amount Apk according to the operating state of the vehicle when the on command is input. As parameters indicating the operating state of the vehicle, input to the lead amount determining unit 134 are the FB gain G_FB, the rotation speed Npri, the input torque Tsec, the transmission ratio Ratio, the secondary pressure Psec, and the oil temperature TMP. The lead amount determining unit 134 determines the lead amount Apk according to this plurality of parameters. Said another way, the lead amount Apk is made to be variable according to the operating state of the vehicle. The lead amount determining unit 134 may also have the lead amount Apk be variable according to at least one of this plurality of parameters.

By determining the lead amount Apk according to each parameter, the lead amount determining unit 134 can be made to be variable according to the operating state, and it is possible to set the lead amount A at a targeted frequency. When increasing the lead amount A, the range at which stable operation is possible is limited considering the relationship with specific specifications of the transmission ratio control system 100 such as the variator 20. This limit can be found in advance by calculation or experimentation as a limit amount according to each parameter. The lead amount Apk can be determined by further reducing the lead amount Apk actually determined according to each parameter by the amount of the limit amount set according to each parameter.

The lead amount determining unit 134 determines a first lead amount Apk1 and a second lead amount Apk2 based on the determined lead amount Apk. The first lead amount Apk1 is set corresponding to when performing the primary phase lead compensation described later, and the second lead amount Apk2 is set corresponding to when performing the secondary phase lead compensation described later. The second lead amount Apk2 is ½ of the first lead amount Apk1. The lead amount Apk determined according to each parameter is set so as to correspond to the second lead amount Apk2. The lead amount Apk determined according to each parameter may also be set so as to correspond to the first lead amount Apk1. The lead amount Apk is input from the lead amount determining unit 134 to the lead amount filter unit 135.

The lead amount filter unit 135 is provided in the wake of the lead amount determining unit 134, and performs filter processing of the lead amount Apk. The lead amount filter unit 135 is provided in this way in light of placement in the signal path. The lead amount filter unit 135 is specifically a low pass filter unit, and is configured as a first order low pass filter, for example. The lead amount filter unit 135 configures a gain smoothing unit that performs smoothing of changes of the gain G of the phase compensation according to determination of on/off of the phase compensation by performing filter processing of the lead amount Apk when on/off of the lead compensation is switched. By performing smoothing of changes in the gain G, the change amount of the gain G accompanying on/off switching of the phase compensation is suppressed.

The lead amount Apk is input from the lead amount filter unit 135 to the first phase lead compensator 136, the second phase lead compensator 137, and the first switching unit 138. The peak value frequency Fpk from the first peak value frequency determination unit 141 is also input to the first phase lead compensator 136 and the second phase lead compensator 137. Based on the lead amount Apk input to both the first phase lead compensator 136 and the second phase lead compensator 137, and also the peak value frequency Fpk, primary phase lead compensation of the feedback primary indicated pressure Ppri_FB is performed. By performing phase lead compensation of the feedback primary indicated pressure Ppri_FB, phase lead compensation of the feedback transmission control of the transmission 4 is performed. The first phase lead compensator 136 and the second phase lead compensator 137 are specifically configured by a primary filter, and by performing filter processing according to the inputted lead amount Apk and the further inputted peak value frequency Fpk, the primary phase lead compensation of the feedback primary indicated pressure Ppri_FB is performed.

The second phase lead compensator 137 is provided in series with the first phase lead compensator 136. The second phase lead compensator 137 is provided in this way in light of placement in the signal path. The second phase lead compensator 137 has the feedback primary indicated pressure Ppri_FB for which primary phase lead compensation was performed by the first phase lead compensator 136 input. Therefore, the second phase lead compensator 137 further performs again the primary phase lead compensation when performing the primary phase lead compensation of the feedback primary indicated pressure Ppri_FB. By doing this, the secondary phase lead compensation of the feedback primary indicated pressure Ppri_FB is performed. The second phase lead compensator 137 configures the lead compensation unit together with the first phase lead compensator 136.

The first switching unit 138 switches between when performing phase lead compensation with the first phase lead compensator 136 and the second phase lead compensator 137 according to the input lead amount Apk, in other words, when performing secondary phase lead compensation, and when performing phase lead compensation only with the first phase lead compensator 136, in other words, when performing primary phase lead compensation. This is because by performing secondary phase lead compensation, an increase in gain G is suppressed compared to when performing primary phase lead compensation, making it possible to suppress destabilization of the transmission control. Also, when the lead amount A of the primary phase lead compensation according to the feedback primary indicated pressure Ppri_FB is smaller than the prescribed value A1, while the gain suppression effect cannot be expected, by performing the primary phase lead compensation, the gain G is decreased by frequency deviation, because it is possible to avoid the circumstance of the damping effect being more easily reduced. The prescribed value A1 can be set preferably to a minimum value within the range for which the gain suppression effect can be obtained by having the phase lead compensation in secondary mode.

In this way, for performing phase lead compensation, the lead amount determining unit 134 and the first switching unit 138 are configured specifically in the following manner.

Specifically, the lead amount determining unit 134 makes a judgment to perform primary phase lead compensation when the lead amount A determined according to each parameter is less than the prescribed value A1, and determines the lead amount Apk to be the first lead amount Apk1. Also, the lead amount determining unit 134 makes a judgment to perform secondary phase lead compensation when the lead amount A is the prescribed value A1 or greater, and determines the lead amount Apk to be the second lead amount Apk2. The lead amount A can be set in advance using map data, etc.

The first switching unit 138 performs switching so as to perform phase lead compensation only by the first phase lead compensator 136 when the first lead amount Apk1 is selected. Also, the first switching unit 138 performs switching so as to perform phase lead compensation with the first phase lead compensator 136 and the second phase lead compensator 137 when the second lead amount Apk2 is selected. By configuring in this way, the first phase lead compensator 136 and the second phase lead compensator 137 are configured to perform phase lead compensation only with the first phase lead compensator 136 when the lead amount A is smaller than the prescribed value A1.

The first switching unit 138 may also be configured to perform phase lead compensation only with the second phase lead compensator 137 when performing primary phase lead compensation. The lead amount determining unit 134 may also input lead amount A to the first switching unit 138 instead of the lead amount Apk. The first switching unit 138 can also perform switching based on the lead amount A input in this way. By doing this, even if smoothing is implemented on the first lead amount Apk1 and the second lead amount Apk2, primary and secondary phase lead compensation can be performed as appropriate.

The first switching unit 138, together with the phase compensation on/off determination unit 133, has the feedback primary indicated pressure Ppri_FB for which lead compensation was performed by at least one of the first phase lead compensator 136 and the second phase lead compensator 137 according to the pulley state value M is set as the feedback primary indicated pressure Ppri_FB. At least one of the first phase lead compensator 136 and the second phase lead compensator 137 configures the lead compensation unit that performs lead compensation of the feedback primary indicated pressure Ppri_FB. The feedback primary indicated pressure Ppri_FB for which lead compensation was performed is output to the first phase delay compensator 145.

The first peak value frequency determination unit 141 determines a peak value frequency Fpk1 of the phase lead compensation. The first peak value frequency determination unit 141 changes the peak value frequency Fpk1 by determining the peak value frequency Fpk1 according to the transmission ratio Ratio. The transmission ratio Ratio, in specific terms, has the target transmission ratio Ratio_D input from the target value generating unit 131. The peak value frequency Fpk1 determined by the first peak value frequency determination unit 141 is input respectively to the first phase lead compensator 136 and the second phase lead compensator 137. By doing this, the first peak value frequency determination unit 141 is configured so as to set the peak value frequency Fpk of the respective phase lead compensations performed by the first phase lead compensator 136 and the second phase lead compensator 137 based on the transmission ratio Ratio.

The delay amount determination unit 142 determines a delay amount Bpk. The delay amount determination unit 142 is provided in the wake of the phase compensation on/off determination unit 133. The delay amount determination unit 142 is provided in this way in light of placement in the signal path. The delay amount determination unit 142 determines the delay amount Bpk according to the on/off command, said another way, according to the on/off determination of the phase compensation. The delay amount determination unit 142 determines the delay amount Bpk to be zero when the off command is input. The delay amount determination unit 142 determines the delay amount Bpk according to the operating state of the vehicle when the on command is input. As parameters indicating the operating state of the vehicle, input to the delay amount determination unit 142 are the FB gain G_FB, the rotation speed Npri, the input torque Tsec, the transmission ratio Ratio, the secondary pressure Psec, the vehicle acceleration, the brake operating state, the primary pressure Ppri, the engine torque, the torque ratio of the torque converter, the engagement state of the LU clutch 2a, the oil temperature TMP, etc. The delay amount determination unit 142 determines the delay amount Bpk according to this plurality of parameters. Said another way, the delay amount Bpk is made to vary according to the operating state of the vehicle. The delay amount determination unit 142 may also have the delay amount Bpk be varied according to any one of this plurality of parameters.

The delay amount determination unit 142, by determining the delay amount Bpk according to each parameter based on settings (that are not illustrated), is able to make this variable according to the operating state, and can set the delay amount B at the targeted frequency. When increasing the delay amount B, this is limited to a range for which stable operation is possible, considering the relationship with the specific specifications of the transmission ratio control system 100 such as the variator 20, etc. This limit can be found in advance by calculation or experimentation as the limit amount according to each parameter. The delay amount Bpk is determined by further reducing the delay amount Bpk actually determined according to each parameter by the amount of the limit amount set according to each parameter.

The delay amount determination unit 142 determines a first delay amount Bpk1 and a second delay amount Bpk2 based on the determined delay amount Bpk. The first delay amount Bpk1 is set corresponding to when performing the primary phase delay compensation described later, and the second delay amount Bpk2 is set corresponding to when performing the secondary phase delay compensation described later. The second delay amount Bpk2 is set to ½ the first delay amount Bpk1. The delay amount Bpk determined according to each parameter is set so as to correspond with the second delay amount Bpk2. The delay amount Bpk determined according to each parameter may also be set so as to correspond to the first delay amount Bpk1. The delay amount Bpk is input from the delay amount determination unit 142 to the delay amount filter unit 143.

The delay amount filter unit 143 is provided in the wake of the delay amount determination unit 142, and performs filter processing of the delay amount Bpk. The delay amount filter unit 143 is provided in this way in light of placement in the signal path. The delay amount filter unit 143 is specifically a low pass filter unit, and is configured using a first order low pass filter, for example. By performing filter processing of the delay amount Bpk, when on/off of the phase compensation is switched, the delay amount filter unit 143 configures a gain smoothing unit for performing smoothing of changes in gain of the phase delay compensation according to determination of on/off of phase compensation. By performing smoothing of changes in gain, there is suppression of the change amount of the gain accompanying switching of on/off of the phase compensation.

The second peak value frequency determination unit 144 determines the peak value frequency Fpk2 of the phase delay compensation. The second peak value frequency determination unit 144 changes the peak value frequency Fpk2 by determining the peak value frequency Fpk2 according to the transmission ratio Ratio. In specific terms, the transmission ratio Ratio has the target transmission ratio Ratio_D input from the target value generating unit 131. The peak value frequency Fpk2 determined by the second peak value frequency determination unit 144 is input respectively to the first phase delay compensator 145 and the second phase delay compensator 146. By doing this, the second peak value frequency determination unit 144 is configured to set the peak value frequency Fpk2 of the respective phase delay compensations performed by the first phase delay compensator 145 and the second phase delay compensator 146 based on the transmission ratio Ratio.

The delay amount Bpk from the delay amount filter unit 143 is input to the first phase delay compensator 145, the second phase delay compensator 146, and the second switching unit 147. The peak value frequency Fpk2 from the second peak value frequency determination unit 144 is also input to the first phase delay compensator 145 and the second phase delay compensator 146. The primary phase delay compensation of the feedback primary indicated pressure Ppri_FB is performed based on the delay amount Bpk input for both the first phase delay compensator 145 and the second phase delay compensator 146, and further on the input peak value frequency Fpk2. By performing phase delay compensation of the feedback primary indicated pressure Ppri_FB, phase delay compensation of the feedback transmission control of the transmission 4 is performed. The first phase delay compensator 145 and the second phase delay compensator 146 are specifically configured by a primary filter, and by performing filter processing according to the input delay amount Bpk, and further to the input peak value frequency Fpk2, the primary phase delay compensation of the feedback primary indicated pressure Ppri_FB is performed.

The second phase delay compensator 146 is provided in series with the first phase delay compensator 145. The second phase delay compensator 146 is provided in this way in light of placement in the signal path. The second phase delay compensator 146 has input the feedback primary indicated pressure Ppri_FB for which primary phase delay compensation was performed by the first phase delay compensator 145. Therefore, when the second phase delay compensator 146 performs the primary phase delay compensation of the feedback primary indicated pressure Ppri_FB, it further performs the primary phase delay compensation again. By doing this, the secondary phase delay compensation of the feedback primary indicated pressure Ppri_FB is performed. The second phase delay compensator 146 configures the delay compensation unit together with the first phase delay compensator 146.

The second switching unit 147 switches between when performing phase delay compensation by the first phase delay compensator 145 and the second phase delay compensator 146 according to the input delay amount Bpk, in other words, when performing secondary phase delay compensation, and when performing phase delay compensation only by the first phase delay compensator 145, in other words, when performing the primary phase delay compensation. By performing secondary phase delay compensation, compared to when performing primary phase delay compensation, it is possible to narrow the range affected by the delay amount. Thus, it is possible to avoid immediately reaching the stable limit without needing to lower the peak frequency Fpk2. Also, when the lead amount B of the primary phase delay compensation according to the feedback primary indicated pressure Ppri_FB is smaller than a prescribed value B1, phase delay compensation is performed only with the first phase delay compensator 145, and when the lead amount B is greater than the prescribed value B1, secondary phase delay compensation is performed using the second phase delay compensator.

In this way, for performing phase delay compensation, the delay amount determination unit 142 and the second switching unit 147 are specifically configured as follows. Specifically, the delay amount determination unit 142 makes a judgment to perform primary phase delay compensation when the delay amount B determined according to each parameter is smaller than the prescribed value B1, and determines that the delay amount Bpk is the first delay amount Bpk1. Also, the delay amount determination unit 142 makes a judgment to perform the secondary phase delay compensation when the delay amount B is the prescribed value B1 or greater, and determines that the delay amount Bpk is the second delay amount Bpk2. The delay amount B can be set in advance using map data, etc.

The second switching unit 147 performs switching so that when the first delay amount Bpk1 is selected, phase delay compensation is performed only by the first phase delay compensator 145. Also, when the second delay amount Bpk2 is selected, the second switching unit 147 performs switching so that phase delay compensation is performed by the first phase delay compensator 145 and the second phase delay compensator 146. By configuring in this way, the first phase delay compensator 145 and the second phase delay compensator 146 are configured to perform phase delay compensation only by the first phase delay compensator 145 when the delay amount B is smaller than the prescribed value B1. Specifically, the more the delay amount of the phase delay compensator increases, the more it is possible to reduce the phase delay of the peak frequency range. For that reason, since the low frequency phase delay for which control excitation occurs is eliminated, control excitation does not occur easily. However, from when the delay amount exceeds 40 deg., for example, the drop amount of high frequency gain is reduced, decreasing robustness. Thus, when the delay amount is lower than 40 deg., the demerits of changing to secondary mode are stronger, so only the first phase delay compensator 145 is used.

The second switching unit 147 may also be configured to perform phase delay compensation only by the second phase delay compensator 146 when performing primary phase delay compensation. The delay amount determination unit 142 may also have the delay amount B input to the second switching unit 147 instead of the delay amount Bpk. The second switching unit 147 may also perform switching based on the delay amount B input in this way. By doing this, even if smoothing is implemented on the first delay amount Bpk1 or the second delay amount Bpk2, the primary and secondary phase delay compensation can be performed as appropriate.

The second switching unit 147, together with the phase compensation on/off determination unit 133, configures a setting unit that sets as the feedback primary indicated pressure Ppri_FB the feedback primary indicated pressure Ppri_FB for which delay compensation was performed by at least one of the first phase delay compensator 136 and the second phase delay compensator 137 according to the pulley state value M. At least one of the first phase delay compensator 136 and the second phase delay compensator 137 configures the delay compensation unit that performs the delay compensation of the feedback primary indicated pressure Ppri_FB. The feedback primary indicated pressure Ppri_FB for which delay compensation was performed configures the feedback command value after compensation.

Input to the actuator 111 are the feedback primary indicated pressure Ppri_FB selected from the first switching unit 138, and a primary indicated pressure Ppri_FF (not illustrated) set based on the target transmission ratio Ratio_D (the target primary indicated pressure that determines balance thrust or transmission ratio). The actuator 111 is a primary pressure control valve that controls the primary pressure Ppri provided in the hydraulic control circuit 11, for example, and controls the primary pressure Ppri so that the actual pressure Ppri_A of the primary pressure Ppri becomes the indicated pressure Ppri_D according to the target transmission ratio Ratio_D. By doing this, the transmission ratio Ratio is controlled so that the actual transmission ratio Ratio_A becomes the target transmission ratio Ratio_D.

A sensor unit 40 detects the actual transmission ratio Ratio_A of the variator 20. The sensor unit 40 is specifically configured by the rotation speed sensor 42 and the rotation speed sensor 43. The actual transmission ratio Ratio_A that is the actual value (sensor value) of the transmission ratio detected by the sensor unit 40 is input to the sensor value filter unit 140. An on/off command is also input via the on/off command filter unit 139 to the sensor value filter unit 140. The on/off command filter unit 139 outputs an on command to the sensor value filter unit 140 when the lead compensation is on, outputs an off command to the sensor value filter unit 140 when the lead compensation is off. The on/off command filter unit 139 may also be omitted.

The sensor value filter unit 140 performs filter processing of the actual transmission ratio Ratio_A. With the sensor value filter unit 140, the mode of the filter processing is changed according to the on/off command. In specific terms, with the sensor value filter unit 140, the filter processing order or execution/stopping is switched according to the on/off command. The sensor value filter unit 140 is a first order low pass filter when the off command is input, and is a higher order low pass filter or filter processing is stopped when the on command is input.

By configuring the sensor value filter unit 140 in this way, when a first order low pass filter is used, a slight delay occurs in the region of a frequency to be removed or lower, whereas when the on command is input, delay is improved. As a result, it is possible to further advance the phase of the feedback primary indicated pressure Ppri_FB. The sensor value filter unit 140 can be a configuration having one or a plurality of first order low pass filters provided with the ability to switch execution/stop or order of filter processing, for example. The actual transmission ratio Ratio_A from the sensor value filter unit 140 is input to the FB compensator 132.

With the PT resonance detection unit 150, the vibration component of longitudinal acceleration G detected by the G sensor 53 is extracted, and when the state of the amplitude of the vibration component being a prescribed value continues for a prescribed time or longer, it is judged that vibration is occurring. On the other hand, when the state of the amplitude of the vibration component being less than the prescribed value continues for a prescribed time or longer, it is judged that vibration is not occurring.

With the oil vibration detection unit 151, first, the voltage signal detected by the hydraulic sensor 52 is converted to a hydraulic signal, the DC component (fluctuating component according to the control command) is removed by the bandpass filter processing, and only the vibration component is extracted. Then, the amplitude of the vibration component is calculated, and when the state of the amplitude of the hydraulic signal being the prescribed amplitude or greater continues for a prescribed time or longer, it is judged that oil vibration is occurring. On the other hand, when oil vibration is occurring, when the state of the amplitude being less than the prescribed amplitude continues for the prescribed time or longer, it is judged that oil vibration is not occurring. As the hydraulic signal, it is possible to use the primary pulley hydraulic pressure, or to use both.

With the divergence detection unit 152, a detection is made of whether the final command signal is diverging. Here, divergence of the command signal is detected based on whether the frequency is a prescribed value or greater, and whether the state of the amplitude being a prescribed value or greater has continued for a prescribed time.

As explained above, with the embodiment, the following operational effects are obtained.

(1) The control device of a continuously variable transmission that performs transmission control of the transmission 4 so that the actual pressure Ppri_A becomes the indicated pressure Ppri_D, having: the first phase lead compensator 136 and the second phase lead compensator 137 that perform lead compensation of the indicated pressure Ppri_D; the first phase delay compensator 145 and the second phase delay compensator 146 that perform delay compensation of the indicated pressure Ppri_D; and the phase compensation on/off determination unit 133 (setting unit) that sets as the indicated pressure Ppri_D the indicated pressure Ppri_D2 for which compensation was performed by the first phase lead compensator 136, the second phase lead compensator 137, the first phase delay compensator 145, and the second phase delay compensator 146 according to at least one of the rotation speed Npri, the input torque Tsec, the transmission ratio Ratio, and the rate of change α.

Thus, it is possible to set as the indicated pressure Ppri_D the indicated pressure Ppri_D2 in the region for which longitudinal vibration occurs. For this reason, it is possible to try to improve as necessary the stability of the transmission ratio Ratio by phase compensation of the indicated pressure Ppri_D, and by converging the longitudinal vibration, it is possible to improve as appropriate the longitudinal vibration of the transmission 4. Also, to increase the stability of the transmission ratio Ratio by phase compensation, it is possible to also try to improve control responsiveness of the transmission ratio Ratio. Furthermore, when it is not necessary to increase the stability of the transmission ratio Ratio, it is possible to prevent the occurrence of vibration of the actual pressure Ppri_A.

Also, with the sensor value filter unit 140, together with performing filter processing, a high order low pass filter is configured. As a result, though when the first order low pass filter is used, a slight delay occurs in the region of the frequency to be removed or lower, this makes it possible possible to improve the delay, and by doing this, possible to further advance the phase of the indicated pressure Ppri_D.

(2) The phase compensation on/off determination unit 133 sets as the indicated pressure Ppri_D (target transmission control value) the indicated pressure Ppri_D2 (target transmission control value after compensation) when the operating point M according to the rotation speed Npri and the input torque Tsec is in the phase compensation region R set according to the rotation speed Npri and the input torque Tsec. Thus, by increasing the stability of the transmission ratio Ratio with the region among the regions according to the rotation speed Npri and the input torque Tsec for which longitudinal vibration occurs as the compensation region R, it is possible to improve the longitudinal vibration as appropriate.

(3) The phase compensation region R includes a region for which the input torque Tsec is smaller than the prescribed torque Tsec1. Thus, it is possible to set the phase compensation region R as appropriate.

(4) The phase compensation region R further includes a region R2 for which the input torque Tsec is the prescribed torque Tsec1 or greater, and the rotation speed Npri is the prescribed rotation speed Npri1 or greater. The prescribed rotation speed Npri1 is set so as to be larger the larger that the input torque Tsec becomes. Thus, the phase compensation region R can be further set as appropriate.

(5) The phase compensation on/off determination unit 133 sets as the indicated pressure Ppri_D the indicated pressure Ppri_D2 when the transmission ratio Ratio is greater than the prescribed transmission ratio Ratio1. By doing this, it is possible to improve the longitudinal vibration as appropriate according to the transmission ratio Ratio.

(6) The phase compensation on/off determination unit 133 sets as the indicated pressure Ppri_D the indicated pressure Ppri_D2 when the rate of change α is smaller than the prescribed value. By doing this, it is possible to improve the longitudinal vibration as appropriate according to the rate of change α.

(7) The transmission 4 has power input via the torque converter 2 with the LU clutch 2a. Also, the phase compensation on/off determination unit 133 further sets as the indicated pressure Ppri_D the indicated pressure Ppri_D2 when the LU clutch 2a is engaged. By doing this, it is possible to improve the longitudinal vibration as appropriate according to the engagement state of the LU clutch 2a.

Other Embodiments

Above, a mode for carrying out the present invention was explained based on the embodiment, but the specific configuration of the present invention is not limited to the configuration shown in the embodiment, and even if there are design changes, etc., in a range that does not depart from the gist of the invention, these are included in the present invention.

For example, with the embodiment, a case was explained when the phase compensation on/off determination unit 133 sets as the indicated pressure Ppri_D the indicated pressure Ppri_D2 according to all four parameters of the rotation speed Npri1, the input torque Tsec, the transmission ratio Ratio, and the rate of change α. In contrast to this, it is also possible to configure so as to set as the indicated pressure Ppri_D the indicated pressure Ppri_D2 according to at least one of the parameters of the abovementioned four parameters. In this case as well, by increasing the stability of the transmission ratio Ratio as appropriate in relation to any of the parameters, it is possible to improve the longitudinal vibration as appropriate. Also, a case was explained when the phase compensation region R itself is set according to the transmission ratio Ratio, the rate of change α, and the engagement state of the LU clutch 2a. In contrast to this, for example, it is also possible to configure so that for judging whether the operating points M are in the phase compensation region R, a different judgment is performed without including the judgment regarding the transmission ratio Ratio, the rate of change α, and the engagement state of the LU clutch 2a. Also, a case was explained when the phase compensation region R inside/outside judgment is performed by the phase compensation on/off determination unit 133, but it is also possible to have a configuration with judgment by the first switching unit 138 or the second switching unit 147. Also, with the embodiment, an example of the abovementioned control being configured within the transmission controller 12 was shown, but it is also possible to realize this with a plurality of controllers.

The invention claimed is:

1. A control device for a continuously variable transmission that performs transmission control of the continuously variable transmission so that an actual transmission control value becomes a target transmission control value, the control device for a continuously variable transmission comprising:
   a processor constituting
      a lead compensation unit configured to perform lead compensation of the target transmission control value according to at least one of an input side rotation speed of the continuously variable transmission, an input torque to a driven side rotation element of the continuously variable transmission, a transmission ratio of the continuously variable transmission, and a rate of change of the transmission ratio;
      a delay compensation unit configured to perform delay compensation of the target transmission control value according to at least one of the input side rotation speed of the continuously variable transmission, the input torque to the driven side rotation element of the continuously variable transmission, the transmission ratio of the continuously variable transmission, and a rate of change of the transmission ratio; and
      a setting unit configured to set a post-compensation target transmission control value for which the lead compensation and the delay compensation are performed as the target transmission control value.

2. The control device for a continuously variable transmission of claim 1, wherein
   when operating points according to the input side rotation speed and the input torque are in a compensation region set according to the input side rotation speed and the input torque, the setting unit is configured to set as the target transmission control value the post-compensation target transmission control value.

3. The control device for a continuously variable transmission of claim 2, wherein
   the compensation region includes a region for which the input torque is smaller than a prescribed torque.

4. The control device for a continuously variable transmission of claim 3, wherein
   the compensation region further includes a region for which the input torque is the prescribed torque or greater, and the input side rotation speed is a prescribed rotation speed or greater, and
   the prescribed rotation speed is set so that the larger that the input torque is, the larger the prescribed rotation speed is.

5. The control device for a continuously variable transmission of claim 1, wherein
   when the transmission ratio is larger than a prescribed transmission ratio, the setting unit is configured to set as the target transmission control value the post-compensation target transmission control value.

6. The control device for a continuously variable transmission of claim 1, wherein
   when the rate of change is smaller than a prescribed value, the setting unit is configured to set as the target transmission control value the post-compensation target transmission control value.

7. The control device for a continuously variable transmission of claim 1, wherein
   the continuously variable transmission has power input via a torque converter with a lock-up clutch, and
   when the lock-up clutch is further engaged, the setting unit is configured to set as the target transmission control value the post-compensation target transmission control value.

8. A control method for a continuously variable transmission that performs transmission control of the continuously variable transmission so that an actual transmission control value becomes a target transmission control value, the control method for a continuously variable transmission comprising:
   performing lead compensation of the target transmission control value according to at least one of an input side rotation speed of the continuously variable transmission, an input torque to a driven side rotation element of the continuously variable transmission, a transmission ratio of the continuously variable transmission, and a rate of change of the transmission ratio;
   performing delay compensation of the target transmission control value according to at least one of the input side rotation speed of the continuously variable transmission, the input torque to the driven side rotation element of the continuously variable transmission, the transmission ratio of the continuously variable transmission, and the rate of change of the transmission ratio; and
   setting a post-compensation target transmission control value for which the lead compensation and the delay compensation are performed as the target transmission control value.

* * * * *